A. H. NEULAND.
DYNAMO ELECTRIC MACHINE.
APPLICATION FILED NOV. 24, 1916.
1,348,037.
Patented July 27, 1920.
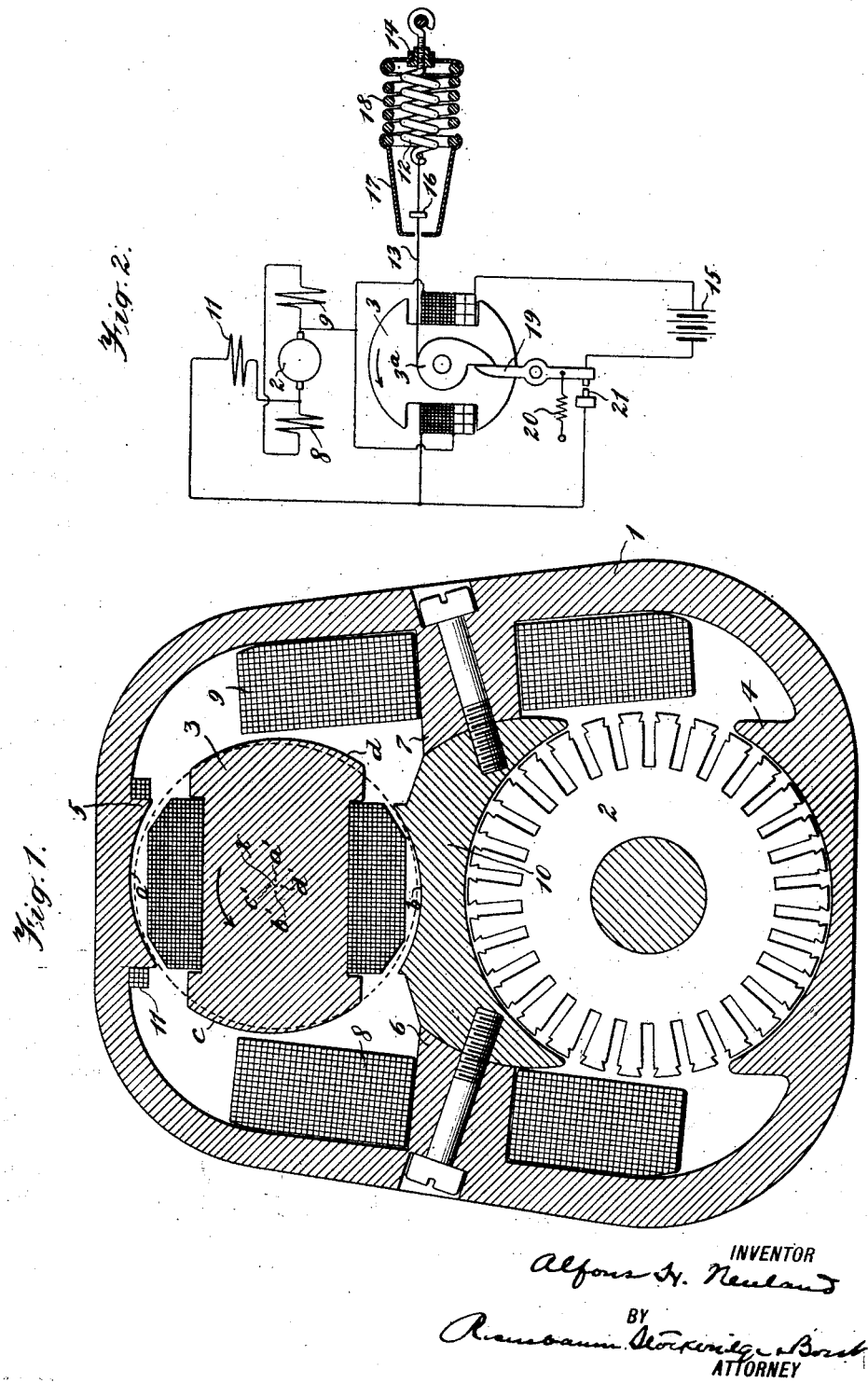
INVENTOR
Alfons H. Neuland
BY
ATTORNEY

UNITED STATES PATENT OFFICE.

ALFONS H. NEULAND, OF SAN FRANCISCO, CALIFORNIA.

DYNAMO-ELECTRIC MACHINE.

1,348,037.  Specification of Letters Patent.  Patented July 27, 1920.

Application filed November 24, 1916. Serial No. 133,111.

*To all whom it may concern:*

Be it known that I, ALFONS H. NEULAND, a subject of the Czar of Russia, residing at San Francisco, in the county of San Francisco and State of California, have invented certain new and useful Improvements in Dynamo-Electric Machines, of which the following is a full, clear, and exact description.

My invention relates to dynamo-electric machines and particularly to means for regulating the generated voltage and current of variable speed dynamos, this invention being specific to that disclosed and claimed in my prior Patent Number 1,157,414. In that patent, I disclosed a regulator consisting of a shunt member rotative between supplemental poles of the field magnet and operative to shunt a greater or less number of lines of force from the armature, depending upon the rotative position of the shunt member, the shunt member being provided with a winding energized by the current generated in the armature, the force of which acts upon the field and causes the shunt member to rotate against the force of a spring.

An object of my present invention is to provide such a machine which will be of simple, compact and inexpensive construction, and which will permit the armature, shunt member, and field coils, to be economically inclosed by a steel frame. Another object is to compensate for the decreasing attractive force on the shunt member as the shunt member approaches full shunting position. Another object is to provide means for obtaining various voltage and current characteristics of the machine. Another object is to provide special retractile means controlling the movement of the shunt member and coördinated with the circuit closing switch, which will satisfy the requirements of such machines when used to charge storage batteries. Other objects and advantages of my invention will appear from the following description.

Embodiments of this invention, by reason of their size and strength, are well adapted for use as a generator on power driven vehicles, such as railway coaches, the armature being operatively connected to an axle thereof. In accordance with my invention, I make the casing or housing of magnetic material and arrange a double-faced pole member between the armature and the shunt member which serves for both members, the field coil being carried by the pole member in such a way that the flux passes either through the shunt member or through the armature or divides and traverses both members, the casing serving to complete the magnetic path.

To compensate for the decreasing attractive force on the shunt member as alinement increases I so construct the shoes of the supplemental poles and the faces of the shunt member coöperating therewith that the air gaps between them are progressively decreased as the shunt member rotates from partial to complete alinement.

My invention also comprehends a winding on one or both of the supplemental poles and energized by the current generated in the armature, the manner of connecting the winding with the armature depending upon the particular voltage and current characteristic desired.

The special retractile means included within my invention are constructed to entirely restrain the rotation of the shunt member until the generated potential is substantially equal to that of the battery, whereupon only sufficient rotation is permitted to close the battery circuit, and the further rotation for regulating purposes is permitted only when a predetermined potential is generated. My invention also comprehends other features of construction as will hereinafter more fully appear.

I shall now describe the illustrated embodiment of my invention and shall thereafter point out my invention in claims.

Figure 1 is a transverse section of a complete machine illustrating my invention; and Fig. 2 is a diagram of the electrical circuits, and of the circuit closing mechanism and the retractile means controlling the same.

The casing or housing 1 is preferably made dust and water tight, and is composed of suitable magnetic material, such as iron. The ends of the casing in which the rotatable parts find their bearings are removable and have a tight fit with the body portion which is preferably cast in one piece, as shown. The armature 2 is disposed in the lower part of the casing and the shunt member 3 in the upper part. A pole 4 for the armature is formed on the interior bottom face of the casing, and a pole 5 for the shunt member is formed on the interior top face of the casing.

Between the shunt member and the armature are two opposite inwardly extending pole pieces 6 and 7 integral with the respective sides of the casing, and the field coils 8 and 9 surround these respective pole pieces. Bridging the pole pieces and removably attached thereto, is a pole shoe 10. This pole shoe is double-faced, its lower face serving as a pole shoe for the armature and its upper face serving as a pole shoe for the shunt member. A simple and compact construction is thereby provided which is sufficiently strong to withstand extremely hard usage.

Where the arcuate pole faces $a$ and $b$ of the supplemental poles, and the arcuate ends $c$ and $d$ of the shunt member are concentric with the center of rotation of the shunt member, the shunt member is inclined to stick as soon as partial alinement is reached and the pull thereon decreases appreciably when full alinement is approached. To obviate this I so construct those coöperative faces that the air gap progressively diminishes as alinement increases. As shown, the four arcuate faces $a$, $b$, $c$, and $d$ are of the same radii, but their centers of generation are eccentric to the center of rotation and are so arranged that the center of the faces $c$ and $d$ coincide with the centers of the pole faces $a$ and $b$ only when the shunt member is in position of full alinement, that is, in its maximum shunting position. The center of rotation is indicated at $x$, and the centers of the four arcuate faces $a$, $b$, $c$ and $d$, are indicated at $a'$, $b'$, $c'$ and $d'$, respectively.

When the shunt member is in its minimum shunting position, which is the position shown in the drawing, the centers $a'$ and $b'$ are 90 angular degrees from the centers $c'$ and $d'$ and in the path of rotation thereof. Therefore when the shunt member has rotated 90° to its maximum shunting position, the center $c'$ coincides with the center $b'$, and the center $d'$ coincides with the center $a'$, and the two air gaps are at their minimum. The dotted circular line indicates the path of the advance ends of the faces $c$ and $d$, and the entire area of these faces correspondingly approaches their coöperative pole faces and diminishes the air gap as alinement increases.

In my Patent No. 1,157,414 I have described the winding on the shunt member as fed by the potential and current from the armature; that is, the coil may be connected in shunt to or in series with the armature or partly in shunt and partly in series. In some instances it is desirable to get special voltage and current characteristics, and for this purpose one or both of the supplemental poles may be provided with a winding 11 which, like that on the shunt member, is connected with the armature in shunt, series, compound or differential relation, depending on the characteristic desired.

In order to improve the action of the circuit closing switch operated by the movement of the shunt member I provide for retractile means which permits the shunt member to turn slightly when the increasing armature voltage reaches that of the battery; the switch then closes and further movement is prevented by an added spring until the voltage has increased sufficiently to force the desired current through the battery, whereupon the magnetic force overcomes the tension of both springs and permits the shunt member to perform its action of shunting the flux away from the armature.

This is illustrated diagrammatically in Fig. 2. The shunt member 3 is normally held in the non-shunting position shown by the coiled spring 12 which is connected to one end of a flexible wire or ribbon 13, the other end of the wire being attached to a hub $3^a$ on the shunt member. The tension of the spring 12 is adjusted by a nut 14, and is regulated to hold the shunt member 3 stationary until the generated potential equals that of the battery 15, whereupon the shunt member turns in the direction of the arrow until the stop 16 on the cord 13 engages the casing 17 which is carried by the external and stronger spring 18. This movement of the shunt member releases the pivoted lever 19 and permits it to rotate under the influence of the spring 20 and close the switch 21 in the battery circuit. Further rotation of the shunt member must expand both the springs 12 and 18, and their combined tension is regulated to restrain the shunt member from further rotation for the purpose of regulation until a predetermined voltage and current are attained.

It is obvious that various modifications may be made in the construction shown in the drawing and above particularly described, within the principle and scope of my invention.

I claim:

1. A generator comprising a magnetic casing including an intermediate transverse double-faced pole member, an armature on one side of the pole member adapted to be driven at variable speeds and coöperative with one of the pole faces, a rotative magnetic shunt member on the other side of the pole member coöperative with the other pole face and having a limited movement during which the number of lines of force shunted ranges from a minimum to a maximum, and a field coil so disposed on the pole member that the two pole faces are of the same polarity.

2. A generator comprising a magnetic casing having an arcuate pole formed on each of two opposite inner faces, an intermediate transverse double-faced pole shoe magnetically related to the casing, a field coil so arranged on the pole shoe that the two pole faces are of the same polarity, an armature on one side of the pole shoe adapted to be driven at variable speeds and coöperative with one of the pole faces and with the adjacent pole on the casing, and a rotative magnetic shunt member on the other side of the pole shoe and coöperative with the other pole face and with the adjacent pole on the casing and having a limited movement during which the number of lines of force shunted ranges from a minimum to a maximum.

3. A generator comprising a magnetic casing having an arcuate pole formed on each of two opposite inner faces, an intermediate transverse double-faced pole shoe magnetically related to the casing, a field coil so arranged on the pole shoe that the two pole faces are of the same polarity, an armature on one side of the pole shoe adapted to be driven at variable speeds and coöperative with one of the pole faces and with the adjacent pole on the casing, a rotative magnetic shunt member on the other side of the pole shoe and coöperative with the other pole face and with the adjacent pole on the casing, resilient retractile means opposing the rotation of the shunt member and limiting the rotational movement thereof, and a winding arranged to influence the shunt member fed by the varying potential and current of the armature and serving to develop a varying torque on the pole face to cause the shunt member to rotate to various shunting positions.

4. A generator comprising a magnetic casing having an arcuate pole formed on each of two opposite inner faces, an intermediate transverse double-faced pole shoe magnetically related to the casing, a field coil so arranged on the pole shoe that the two pole faces are of the same polarity, an armature on one side of the pole shoe adapted to be driven at variable speeds and coöperative with one of the pole faces and with the adjacent pole on the casing, a rotative magnetic shunt member on the other side of the pole shoe and coöperative with the other pole face and with the adjacent pole on the casing, resilient retractile means opposing the rotation of the shunt member and limiting the rotational movement thereof, and a winding on the shunt member fed by the varying potential and current of the armature and serving to develop a varying torque on the pole face to cause the shunt member to rotate to various shunting positions.

5. In a generator, a field magnet having a pair of field poles, and a rotative shunt member adapted to bridge the poles. one of the faces on the pole and the coöperative face on the shunt member being arcuate and of the same curvature but both being eccentric to the center of rotation of the shunt member, the generating center of the pole face being in the rotative path of the generating center of the coöperative arcuate face on the shunt member and arranged to coincide therewith when the shunt member is in maximum shunting position, whereby the air gap between said pair of faces is progressively decreased as alinement increases.

6. In a generator, a field magnet having supplemental poles, and a shunt member rotative between the said poles and adapted to bridge the same and form a shunt path for the flux, the pole faces and the coöperative faces on the shunt member being arcuate and of the same curvature but eccentric to the center of rotation, the generating center of each pole face being in the path of the generating center of the coöperative arcuate face on the shunt member and arranged to coincide therewith when the shunt member is in maximum shunting position, whereby the air gaps are progressively decreased as alinement increases.

7. In a generator, the combination with a field magnet having armature poles and supplemental poles, and with an armature adapted to rotate at variable speeds between the armature poles and thereby to have a varying potential generated therein, of means for maintaining a substantially constant potential at varying speeds of the armature comprising a magnetic shunt member rotative between the supplemental poles in magnetic relation thereto and adapted in one position to shunt a minimum number of lines of force and in another position to shunt a maximum number of lines of force, and a winding on one of the supplemental poles fed by the varying potential and current of the armature.

8. In a generator, the combination with a field magnet having armature poles and supplemental poles, and with an armature adapted to rotate at variable speeds between the armature poles and thereby to have a varying potential generated therein, of means for maintaining a substantially constant potential at varying speeds of the armature comprising a magnetic shunt member rotative between the supplemental poles in magnetic relation thereto and adapted in one position to shunt a minimum number of lines of force and in another position to shunt a maximum number of lines of force, a winding on one of the supplemental poles fed by the varying potential and current of the armature, and a winding on the shunt member fed by the varying potential and current from the armature, whereby the shunt member exerts a varying torque on the supplemental poles dependent upon the generated potential and tending to cause the shunt member to rotate to various shunting positions.

9. In a variable speed generator, the combination with a potential regulator comprising a movable magnetic shunt member adapted in various positions to shunt more or less lines of force from the armature, and means carried by the shunt member and controlled by the generated potential in the armature for moving the shunt member into more or less effective shunting position, of a circuit closer for the external circuit arranged to be operated by the shunt member to close the circuit as the shunt member is moved from its least effective shunting position, and compound retractile means for the shunt member operative to permit a circuit-closing movement of the shunt member when a predetermined potential is generated and to restrain further movement of the shunt member until a greater predetermined potential is generated.

10. In a generator, in combination with a field magnet and armature, the field magnet having supplemental poles, a rotative shunt member coöperative with the supplemental poles to shunt more or less lines of force from the armature, and retractile means for the shunt member to restrain rotation thereof comprising a relatively weak resilient member and a relatively strong resilient member, the two resilient members coacting to permit first a partial rotation of the shunt member when a lesser predetermined potential is generated and to permit a further rotation thereof when a greater predetermined potential is generated.

11. In a generator, in combination with a field magnet and armature, the field magnet having supplemental poles, a rotative shunt member coöperative with the supplemental poles to shunt more or less lines of force from the armature, an external circuit including a secondary battery, a circuit closer for the external circuit arranged to be operated by the shunt member to close the circuit as the shunt member rotates from its least effective shunting position; and retractile means for the shunt member to restrain rotation thereof comprising a relatively strong resilient member operatively connected to the shunt member and adapted to restrain rotation thereof until the generated potential substantially equals that of the battery, a relatively weak resilient member, and means operatively coupling the two resilient members after a relatively slight movment of the former, the combined tension of the two members serving to restrain the shunt member from further rotation until a predetermined potential in excess of that of the battery is generated.

In witness whereof I subscribe my signature, in the presence of two witnesses.

ALFONS H. NEULAND.

Witnesses:
 WALDO M. CHAPIN,
 JOHN KEARNS.